(12) United States Patent
Uehane et al.

(10) Patent No.: US 10,697,358 B2
(45) Date of Patent: Jun. 30, 2020

(54) INTAKE PASSAGE STRUCTURE FOR TURBOCHARGER-EQUIPPED ENGINE

(71) Applicant: MAZDA MOTOR CORPORATION, Hiroshima (JP)

(72) Inventors: Yoshiyuki Uehane, Hiroshima (JP); Ken Ohtsuki, Hiroshima (JP); Einosuke Suekuni, Higashihiroshima (JP); Kimio Ishida, Hiroshima (JP); Hiroshi Hosokawa, Hiroshima (JP); Junji Watanabe, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/339,464

(22) PCT Filed: Oct. 11, 2016

(86) PCT No.: PCT/JP2016/080135
§ 371 (c)(1),
(2) Date: Apr. 4, 2019

(87) PCT Pub. No.: WO2018/069972
PCT Pub. Date: Apr. 19, 2018

(65) Prior Publication Data
US 2020/0040810 A1    Feb. 6, 2020

(51) Int. Cl.
*F02B 37/12* (2006.01)
*F02B 39/16* (2006.01)
(Continued)

(52) U.S. Cl.
CPC .............. *F02B 37/12* (2013.01); *F02B 39/16* (2013.01); *F02D 9/02* (2013.01);
(Continued)

(58) Field of Classification Search
CPC ...... F02C 7/045; F04D 29/665; F04D 29/667; F04D 29/685
See application file for complete search history.

(56) References Cited

U.S. PATENT DOCUMENTS 1,802,720 A    4/1931   Junkers
8,272,832 B2 *  9/2012   Yin ...................... F04D 29/444
                                                    415/58.4
(Continued)

FOREIGN PATENT DOCUMENTS

FR    2877992 A1    5/2006
JP    S60-23219 U    2/1985
(Continued)

OTHER PUBLICATIONS

International Search Report issued in PCT/JP2016/080135; dated Dec. 20, 2016.

*Primary Examiner* — Jesse S Bogue
(74) *Attorney, Agent, or Firm* — Studebaker & Brackett PC (57) ABSTRACT

An intake passage structure for a turbocharger-equipped engine (1) includes a supercharging passage (71) and an air relief passage (72) that are provided in a compressor case (72a). The air relief passage (72) has a first passage (73) and a second passage (74), each of which is in a non-linear shape. The first and second passages (73) and (74) each have an air outflow port (73a, 74a) formed through an inner wall surface of an upstream portion (71a) of the supercharging passage (71) upstream of a compressor (21). The air outflow ports (73a, 74a) are formed through different portions of the inner wall surface in a circumferential direction of the inner wall surface so as to overlap with each other in a direction along a central axis of the upstream portion (71a).

5 Claims, 8 Drawing Sheets

(51) Int. Cl.
*F02D 9/02* (2006.01)
*F02M 35/10* (2006.01)

(52) U.S. Cl.
CPC ............. *F02M 35/10144* (2013.01); *F02M 35/10157* (2013.01); *F02M 35/10236* (2013.01); *F02B 2037/125* (2013.01); *F02B 2039/166* (2013.01)

(56) References Cited

U.S. PATENT DOCUMENTS

| | | | |
|---|---|---|---|
| 8,465,251 B2* | 6/2013 | Hosya | F04D 29/4213 |
| | | | 415/119 |
| 9,091,232 B2* | 7/2015 | Anschel | F01D 9/026 |
| 9,951,793 B2* | 4/2018 | Lucas | F04D 29/665 |
| 10,329,999 B2* | 6/2019 | Tabata | F02B 37/00 |
| 10,337,529 B2* | 7/2019 | Karim | F02B 33/40 |
| 2012/0073287 A1 | 3/2012 | Kang et al. | |
| 2012/0117964 A1 | 5/2012 | Chu et al. | |
| 2015/0020783 A1 | 1/2015 | Sadamitsu et al. | |
| 2015/0292421 A1 | 10/2015 | Pursifull et al. | |
| 2015/0377194 A1 | 12/2015 | Hashimoto et al. | |
| 2016/0201693 A1* | 7/2016 | An et al. | F04D 29/4213 |
| | | | 415/58.4 |

FOREIGN PATENT DOCUMENTS

| | | |
|---|---|---|
| JP | H10-331723 A | 12/1998 |
| JP | 2008-75604 A | 4/2008 |
| JP | 2010-222975 A | 10/2010 |
| JP | 2014-141904 A | 8/2014 |
| JP | 2015-90111 A | 5/2015 |
| JP | 2016-11648 A | 1/2016 |
| WO | 2013132577 A1 | 9/2013 |

* cited by examiner

INTAKE PASSAGE STRUCTURE FOR TURBOCHARGER-EQUIPPED ENGINE

TECHNICAL FIELD

The present invention relates to an intake passage structure for a turbocharger-equipped engine.

BACKGROUND ART

As disclosed in Patent Document 1, for example, an intake passage including a compressor of a turbocharger is provided with an air relief passage (in Patent Document 1, referred to as a "bypass passage") through which a portion of intake air supercharged by the compressor is returned to a portion of the intake passage upstream of the compressor. In addition, in Patent Document 1, the air relief passage includes a control valve for adjusting the amount of the intake air returning through the air relief passage. In Patent Document 1, the air relief passage serves to avoid surging of the compressor.

CITATION LIST

Patent Document

[Patent Document 1] Japanese Unexamined Patent Publication No. 2016-11648

SUMMARY OF THE INVENTION

Technical Problem

In general, a throttle valve is disposed in a portion of the intake passage downstream of the compressor. If, while the intake air supercharged by the compressor is being supplied to an intake port of the engine (in turn, a cylinder) with the throttle valve opened, the throttle valve suddenly shifts to a fully closed position or to a position close to the fully closed position, the pressure in a portion of the intake passage between the compressor and the throttle valve may excessively increase, resulting in breakage of the compressor.

To address this problem, as disclosed in Patent Document 1, an air relief passage through which a portion of intake air supercharged by a compressor is returned to an upstream portion of the intake passage upstream of the compressor is provided, and includes a relief valve. When the pressure in the portion of the intake passage between the compressor and the throttle valve has increased, opening the relief valve allows a portion of the intake air supercharged by the compressor to return to the upstream portion of the intake passage upstream of the compressor through the air relief passage. This can prevent the pressure in the portion of the intake passage between the compressor and the throttle valve from excessively increasing.

However, if the air relief passage is bent due to space limitations and other reasons, the intake air that has flowed through the air relief passage to the upstream portion of the intake passage upstream of the compressor flows back through the upstream portion toward an air inlet of the intake passage while swirling along the inner wall surface of the upstream portion. The upstream portion (upstream intake passage) is usually configured as a tube, which vibrates due to a swirl flow therein to emit sound radiation from the surface of the tube.

To prevent such sound radiation, a sound insulating material or a damping material may be attached to the surface of the tube. However, such a method increases cost, and makes it difficult to effectively reduce the sound radiation to a sufficient degree. Thus, such a method is susceptible to improvement.

In view of the foregoing background, it is therefore an object of the present invention to provide a turbocharger-equipped-engine intake passage structure capable of reducing sound radiation emitted from the surface of a tube forming an upstream intake passage.

Solution to the Problem

To achieve the object, the present invention provides an intake passage structure for a turbocharger-equipped engine. The intake passage structure includes: a compressor of the turbocharger housed in a compressor case; an upstream intake passage supplying intake air into the compressor case; a downstream intake passage supplying the intake air supplied into the compressor case and supercharged by the compressor to an intake port of the engine; and a throttle valve disposed in the downstream intake passage. A supercharging passage and an air relief passage are provided in the compressor case, the supercharging passage including the compressor and connecting the upstream intake passage and the downstream intake passage together, the air relief passage connecting an upstream portion of the supercharging passage upstream of the compressor and a downstream portion of the supercharging passage downstream of the compressor together without passing through the compressor, and returning a portion of the intake air supercharged by the compressor to the upstream portion of the supercharging passage upstream of the compressor. The air relief passage has a first passage and a second passage, each of which is in a non-linear shape. The first and second passages each have an air outflow port formed through an inner wall surface of the upstream portion of the supercharging passage upstream of the compressor. The air outflow port of the first passage and the air outflow port of the second passage are formed through different portions of the inner wall surface in a circumferential direction of the inner wall surface so as to overlap with each other in a direction along a central axis of the upstream portion.

According to the above configuration, the intake air flowing through the air outflow port of the first passage to the upstream portion of the supercharging passage upstream of the compressor and the intake air flowing through the air outflow port of the second passage to the upstream portion collide with each other in the upstream portion. This can reduce the velocity of the swirl flow that tends to swirl along the inner wall surface of the upstream portion and the inner wall surface of the upstream intake passage, or can reduce such a swirl flow. Further, since the total cross-sectional area of the first and second passages can be more easily increased than the cross-sectional area of the air relief passage configured as a single passage, the flow velocities of the intake air through the air outflow ports of the first and second passages can be reduced. This can also reduce the velocity of the swirl flow, or reduce the swirl flow. Therefore, even if a sound insulating material or a damping material is not attached to the surface of a tube forming the upstream intake passage, sound radiation from the surface of the tube can be reduced.

In a preferred embodiment of the intake passage structure for the turbocharger-equipped engine, a central axis curve of the first passage and a central axis curve of the second passage are both located on a first plane perpendicular to the central axis of the upstream portion, and on the first plane, an extension line extending from the central axis curve of the first passage to border an end of the central axis curve of the first passage near the air outflow port of the first passage intersects, in the upstream portion, with an extension line extending from the central axis curve of the second passage to border an end of the central axis curve of the second passage near the air outflow port of the second passage.

Thus, the intake air flowing through the air outflow port of the first passage into the upstream portion and the intake air flowing through the air outflow port of the second passage into the upstream portion easily collide with each other in the upstream portion. Further, the intake air flowing through the air outflow port of the first passage and the intake air flowing through the air outflow port of the second passage tend to swirl in directions opposite to each other in the upstream portion and the upstream intake passage, and collide with each other.

This can further reduce the velocity of the swirl flow or reduce the swirl flow.

In a preferred embodiment, if the extension lines intersect with each other as described above, the first and second passages are substantially symmetric to each other with respect to a second plane that is set in advance to be perpendicular to the first plane and to include the central axis of the upstream portion.

As a result, the flow velocities of the intake air through the air outflow port of the first passage and the intake air through the air outflow port of the second passage become equal to each other. Thus, the collision of these intake air flows can further reduce the velocity of the swirl flow or reduce the swirl flow.

In one embodiment of the intake passage structure for the turbocharger-equipped engine, a relief valve capable of opening and closing the air relief passage is provided at a junction between the supercharging passage and the air relief passage, a surface of the compressor case has a drive unit attachment portion to which a drive unit driving the relief valve is attached with a plurality of fastening members, and one of the fastening members is located in a portion of the drive unit attachment portion between the first and second passages.

As a result, a portion of the compressor case between the first and the second passages can be effectively used as a space for fastening members for attaching the drive unit to the drive unit attachment portion of the compressor case. This allows the drive unit to be reliably attached to the drive unit attachment portion without reducing the number of the fastening members.

In another embodiment of the intake passage structure for the turbocharger-equipped engine, the first and second passages are curved to protrude away from each other.

Thus, the intake air through the air outflow port of the first passage and the intake air through the air outflow port of the second passage tend to swirl in the directions opposite to each other in the upstream portion and the upstream intake passage, and collide with each other. This can further reduce the velocity of the swirl flow or reduce the swirl flow.

Advantages of the Invention

As described above, the intake passage structure for a turbocharger-equipped engine according to the present invention can reduce sound radiation from a surface of a tube forming an upstream intake passage without attaching a sound insulating material or a damping material to the surface of the tube.

DESCRIPTION OF EMBODIMENTS

Exemplary embodiments will now be described in detail with reference to the drawings.

Figure 1:
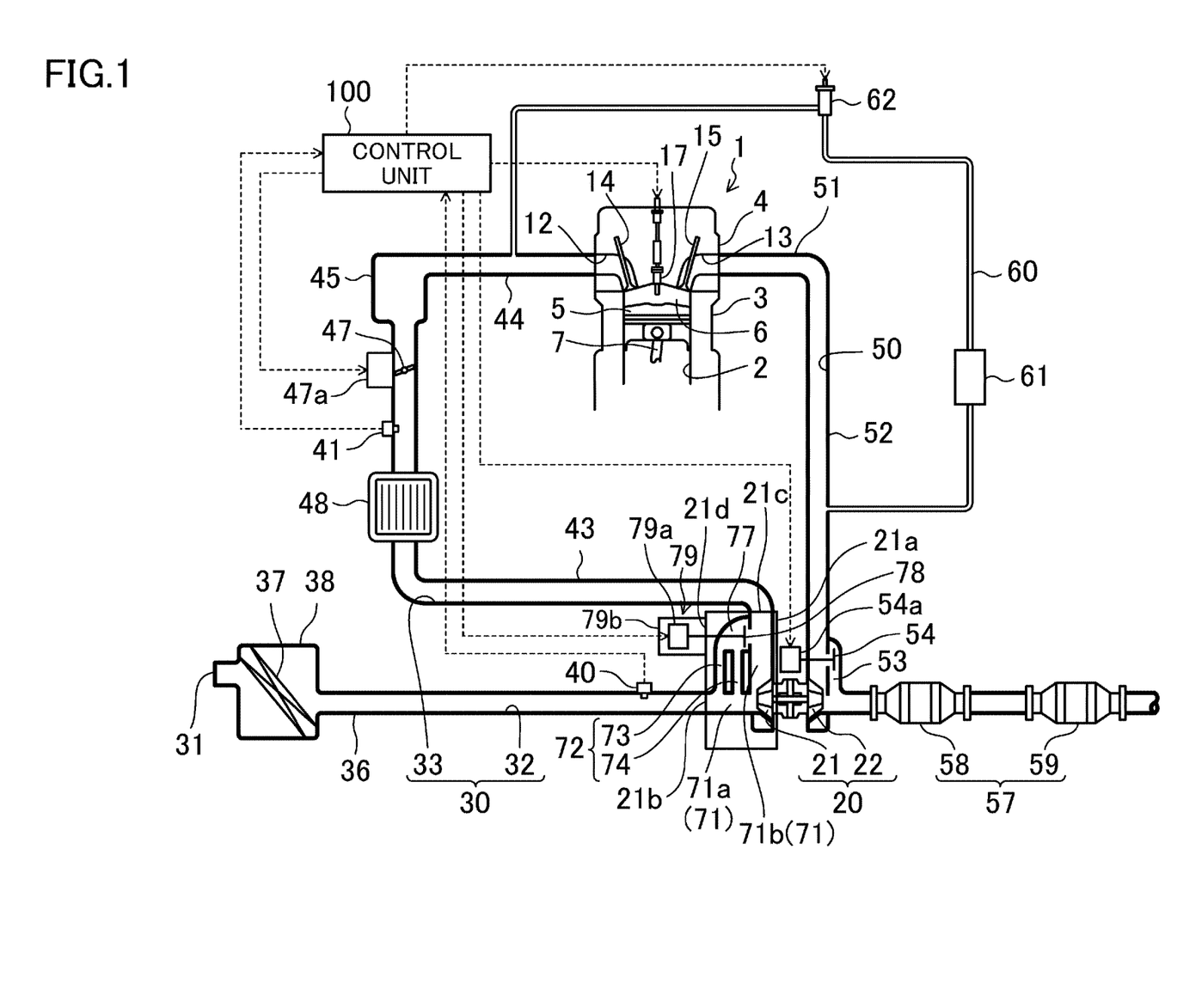
FIG. 1 illustrates a schematic configuration of a turbocharger-equipped engine having an intake passage structure according to an exemplary embodiment.

FIG. 1 illustrates a schematic configuration of a turbocharger-equipped engine 1 (hereinafter simply referred to as an "engine 1") having an intake passage structure according to an exemplary embodiment. The engine 1 is a gasoline engine mounted in an engine compartment located at a front portion of a vehicle, and includes a cylinder block 3 provided with a plurality of (four in this embodiment) cylinders 2 (only one of which is shown in FIG. 1) arranged in a row, and a cylinder head 4 disposed on the cylinder block 3. A piston 5 for defining a combustion chamber 6 between the cylinder head 4 and the piston 5 is reciprocably inserted into, and run through, each of the cylinders 2 of the engine 1. The piston 5 is connected to a crankshaft (not shown) via a connecting rod 7. The crankshaft extends along the row of the cylinders 2 (a direction perpendicular to the paper of FIG. 1).

The cylinder head 4 has an intake port 12 and an exhaust port 13 for each of the cylinders 2, and includes intake valves 14 and exhaust valves 15. The intake valves 14 each open and close an opening of the associated intake port 12 near the combustion chamber 6. The exhaust valves 15 each open and close an opening of the associated exhaust port 13 near the combustion chamber 6. The intake valves 14 are driven by an intake valve driving mechanism (not shown), and the exhaust valves 15 are driven by an exhaust valve driving mechanism (not shown). The intake valves 14 and the exhaust valves 15 each reciprocate at a predetermined timing through an associated one of the intake valve driving mechanism and the exhaust valve driving mechanism to open and close an associated one of the intake ports 12 and the exhaust ports 13, thereby exchanging gas in the associated cylinder 2. The intake valve drive mechanism and the exhaust valve drive mechanism respectively include an intake camshaft and an exhaust camshaft which are drivably coupled to the crankshaft. These camshafts rotate in synchronization with rotation of the crankshaft. At least the intake valve driving mechanism includes a hydraulic or mechanical phase control mechanism capable of continuously changing the phase of the intake camshaft within a predetermined angle range.

An injector (not shown) for injecting fuel is provided in a portion of the cylinder head 4 above the combustion chamber 6 of each cylinder 2. This injector has a fuel injection port formed through the ceiling surface of the combustion chamber 6 to face the combustion chamber 6, and supplies the fuel directly to the combustion chamber 6 in the vicinity of the top dead center of a compression stroke.

Further, a spark plug 17 is disposed in a portion of the cylinder head 4 above the combustion chamber 6 of each cylinder 2. The spark plug 17 has a tip portion (electrode) exposed near a portion of the ceiling of the combustion chamber 6 located on a side of the fuel injection port of the injector. Then, the spark plug 17 is designed to generate a spark at a desired ignition timing.

An intake passage 30 is connected to one surface of the cylinder head 4 in the width direction of the cylinder head 4 (a direction perpendicular to the row of the cylinders 2), i.e., a left surface thereof in FIG. 1, to communicate with the intake port 12 of each cylinder 2. An exhaust passage 50 is connected to the other surface of the cylinder head 4 in the width direction of the cylinder head 4, i.e., a right surface thereof in FIG. 1, to discharge exhaust gas from the combustion chamber 6 of each cylinder 2. A compressor 21 of the turbocharger 20 is disposed in the intake passage 30. The compressor 21 is housed in a compressor case 21a (a specific shape of which is shown in FIGS. 2, 3, 5, and 6). A turbine 22 of the turbocharger 20 is disposed in the exhaust passage 50. The turbine 22 is housed in a turbine case 22a (see FIG. 2). The turbine 22 rotates in response to an exhaust gas flow. The rotation of the turbine 22 causes the compressor 21 coupled to the turbine 22 to operate. The operation of the compressor 21 triggers supercharging of the intake air sucked into the intake passage 30 through an air inlet 31 located at an upstream end of the intake passage 30.

The intake passage 30 includes an upstream intake passage 32 through which intake air sucked into the intake passage 30 from the air inlet 31 is supplied into the compressor case 21a, and a downstream intake passage 33 through which the intake air supplied into the compressor case 21a and supercharged by the compressor 21 is supplied to the intake port 12 of the engine 1.

Figure 2:
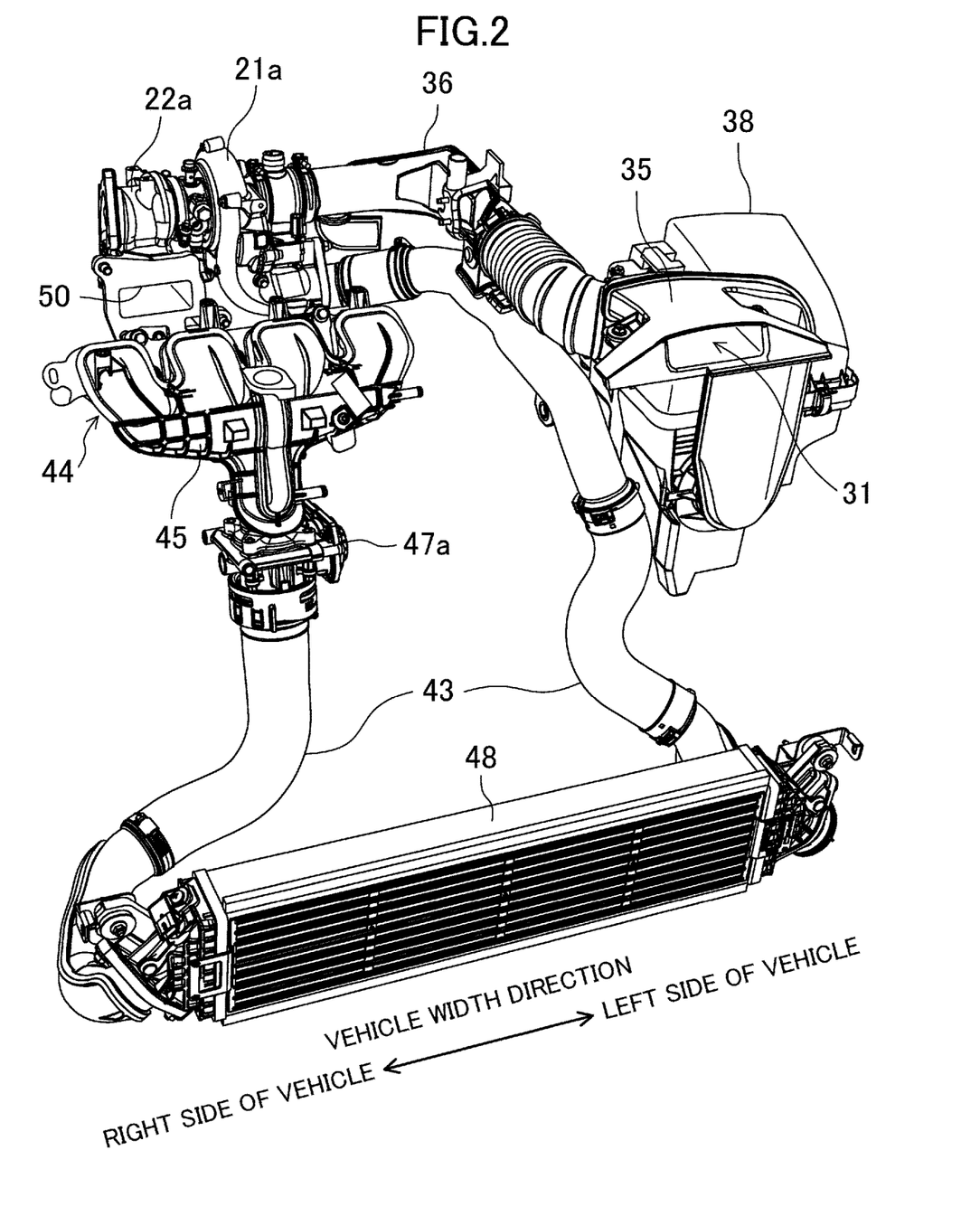
FIG. 2 is a perspective view showing an intake passage for the turbocharger-equipped engine.

As shown in FIG. 2, an upstream end of the upstream intake passage 32 is connected to an inlet forming member 35 having the air inlet 31, and a downstream end of the upstream intake passage 32 is connected to an inlet 21b (see FIG. 3) of the compressor case 21a. The upstream intake passage 32 is defined by an upstream intake pipe 36. An air cleaner 37 for filtering the intake air is disposed in the vicinity of the upstream end of the upstream intake passage 32 (the upstream intake pipe 36). The air cleaner 37 is housed in a cleaner box 38. A first pressure sensor 40 for detecting the pressure in the upstream intake passage 32 is disposed on a portion of the upstream intake passage 32 between the cleaner box 38 and the compressor case 21a.

An upstream end of the downstream intake passage 33 is connected to an outlet 21c (see FIG. 3) of the compressor case 21a, and a downstream end of the downstream intake passage 33 is connected to the intake port 12. The downstream intake passage 33 is defined by a downstream intake pipe 43 and an intake manifold 44 (see FIG. 2). The intake manifold 44 includes independent passages respectively corresponding to the cylinders 2. A downstream end of each of the independent passages is connected to the intake port 12 of an associated one of the cylinders 2. An upstream end of the downstream intake pipe 43 is connected to the outlet 21c of the compressor case 21a, and a downstream end of the downstream intake pipe 43 is connected to the intake manifold 44 through a surge tank 45. The surge tank 45 is integrated with the intake manifold 44.

A throttle valve 47 is disposed in the downstream intake passage 33 (downstream intake pipe 43). The throttle valve 47 is driven by a throttle actuator 47a, such as a stepping motor, to change the cross-sectional area of a portion of the downstream intake passage 33 where the throttle valve 47 is disposed, thereby adjusting the amount of intake air sucked into the combustion chamber 6 of each cylinder 2.

An intercooler 48 is disposed on a portion of the downstream intake passage 33 between the throttle valve 47 and the compressor case 21a to cool the air that has been supercharged (compressed) by the compressor 21. Further, a second pressure sensor 41 is disposed on a portion of the downstream intake passage 33 between the throttle valve 47 and the intercooler 48 to detect the pressure of the intake air supercharged by the compressor 21. The second pressure sensor 41 also functions to detect the pressure in a portion of the downstream intake passage 33 between the compressor case 21a and the throttle valve 47. To perform this function, the second pressure sensor 41 may be disposed on a portion of the downstream intake passage 33 between the compressor case 21a and the intercooler 48.

The exhaust passage 50 is defined by an exhaust manifold 51 and an exhaust pipe 52. The exhaust manifold 51 forms a portion of the exhaust passage 50 near an upstream end thereof, and has independent passages branched off for the respective cylinders 2 and connected to the respective exhaust ports 13, and a collecting portion in which the independent passages collect. The exhaust pipe 52 is connected to a downstream end of the collecting portion.

The exhaust passage 50 (a portion of the exhaust passage 50 configured as the exhaust pipe 52) is provided with an exhaust bypass passage 53 for allowing exhaust gas of the engine 1 to flow without passing through the turbine 22. In other words, an upstream end of the exhaust bypass passage 53 is connected to a portion of the exhaust passage 50 upstream of the turbine 22, and a downstream end of the exhaust bypass passage 53 is connected to a portion of the exhaust passage 50 downstream of the turbine 22.

A wastegate valve 54 driven by a drive motor 54a is provided at the upstream end of the exhaust bypass passage 53. The opening degree of the wastegate valve 54 is continuously variable from 0% (a fully closed position) to 100%. When the opening degree of the wastegate valve 54 is 0%, a total amount of the exhaust gas flows into the turbine 22. When the opening degree is other than 0%, the flow rate of the exhaust gas flowing through the exhaust bypass passage 53 (i.e., the flow rate of the gas flowing into the turbine 22) varies according to the opening degree. In other words, as the opening degree of the wastegate valve 54 increases, the flow rate of the exhaust gas flowing into the exhaust bypass passage 53 increases, and the flow rate of the exhaust gas flowing into the turbine 22 decreases.

An exhaust gas purifier 57 is disposed at a portion of the exhaust passage 50 downstream of the turbine 22 (downstream of a portion of the exhaust passage 50 connected to the downstream end of the exhaust bypass passage 53) to purify harmful components in the exhaust gas. The exhaust gas purifier 57 includes an oxidation catalyst 58 that supports platinum, a mixture of platinum and palladium, or any other component to oxidize CO and HC in the exhaust gas, and a lean NOx catalyst 59 that processes (traps) NOx in the exhaust gas and prevents the NOx from being discharged into the atmosphere. The lean NOx catalyst 59 is disposed downstream of, and away from, the oxidation catalyst 58.

The engine 1 has an EGR passage 60 so that a portion of the exhaust gas is returned from the exhaust passage 50 to the intake passage 30. The EGR passage 60 connects a portion of the exhaust passage 50 between the exhaust manifold 51 and the turbine 22 to the independent passages of the intake manifold 44. The EGR passage 60 includes an EGR cooler 61 for cooling the exhaust gas passing through the EGR passage 60, and an EGR valve 62 for changing the cross-sectional area of the EGR passage 60. The EGR valve 62 adjusts the amount of the exhaust gas returning through the EGR passage 60.

The compressor case 21a includes a supercharging passage 71 and an air relief passage 72. The supercharging passage 71 includes the compressor 21, and connects the upstream intake passage 32 and the downstream intake passage 33 together. The air relief passage 72 connects an upstream portion 71a of the supercharging passage 71 upstream of the compressor 21 and a downstream portion 71b of the supercharging passage 71 downstream of the compressor 21 together without passing through the compressor 21, and is used to return a portion of the intake air supercharged by the compressor 21 to the upstream portion 71a. The air relief passage 72 is provided to prevent the pressure in the downstream portion 71b of the supercharging passage 71 downstream of the compressor 21 and the pressure in the portion of the downstream intake passage 33 between the compressor case 21a and the throttle valve 47 from excessively increasing when the throttle valve 47 suddenly shifts from an open position to a fully closed position or a position close to the fully closed position.

An upstream end of the air relief passage 72 is connected to the downstream portion 71b of the supercharging passage 71 downstream of the compressor 21 through a connection passage 77 provided in the compressor case 21a. A downstream end of the air relief passage 72 is connected directly to the upstream portion 71a of the supercharging passage 71 upstream of the compressor 21.

Figure 3:
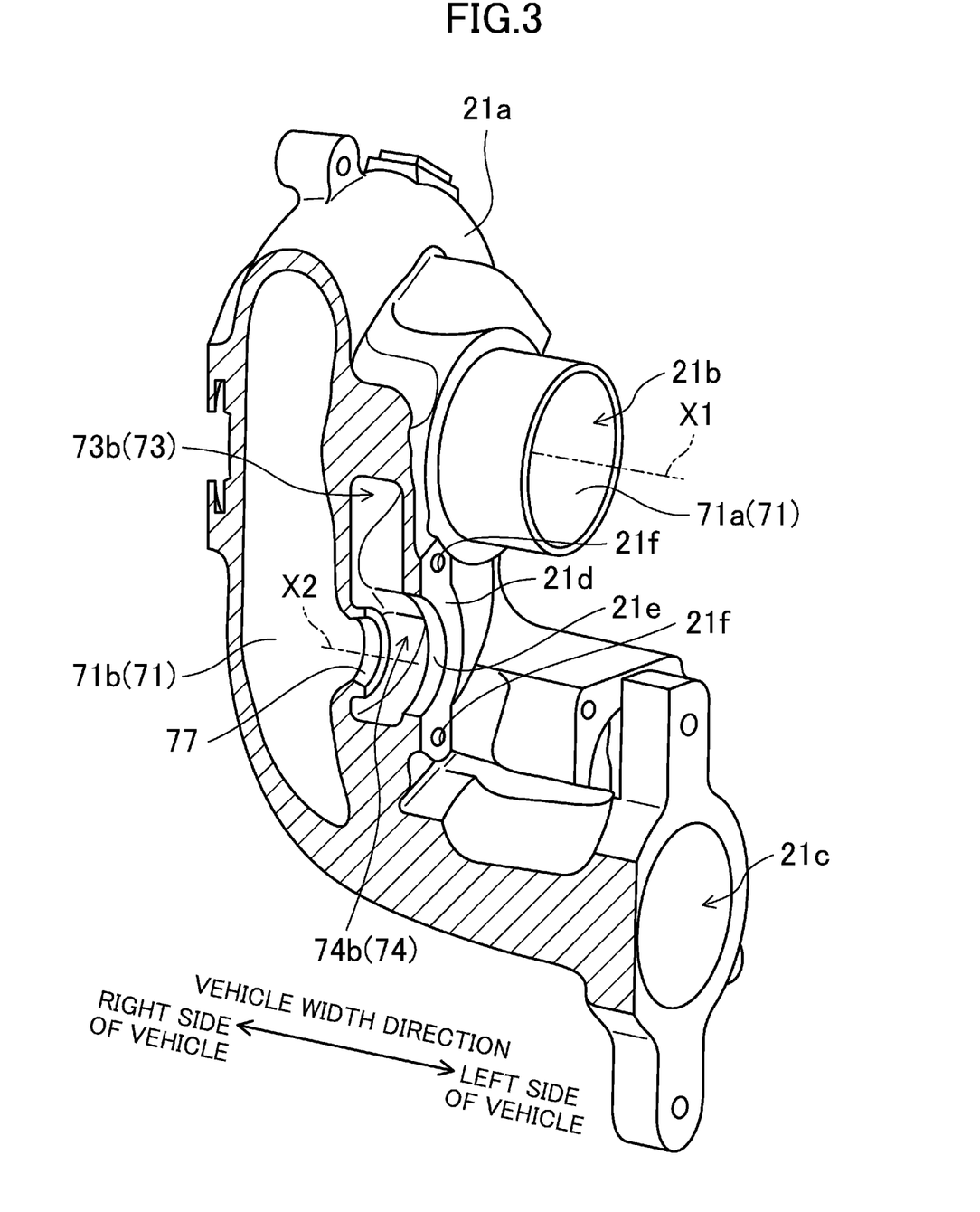
FIG. 3 is a perspective cross-sectional view showing a compressor case and a portion of the inside thereof.
Figure 4:
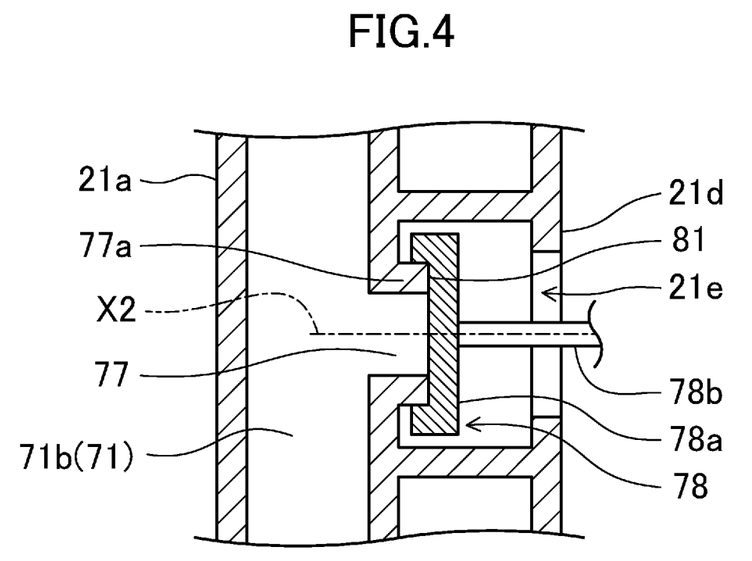
FIG. 4 is a cross-sectional view showing a connection passage and a relief valve.

The connection passage 77 is provided with a relief valve 78 that is placed in a fully opened position or a fully closed position. The relief valve 78 is driven by a drive source 79a, such as a solenoid or a motor, of a drive unit 79, and is fully opened or fully closed. The drive unit 79 is attached to a drive unit attachment portion 21d (see FIGS. 1, 3, 4, and 6) of the surface of the compressor case 21a. When the relief valve 78 is fully opened, the connection passage 77 (that is, the air relief passage 72) communicates with the downstream portion 71b, and a portion of the intake air supercharged by the compressor 21 is returned to the upstream portion 71a. On the other hand, when the relief valve 78 is fully closed, the connection passage 77 (that is, the air relief passage 72) does not communicate with the downstream portion 71b, and the intake air supercharged by the compressor 21 is not returned to the upstream portion 71a. FIG. 3 does not show the relief valve 78, and FIG. 4 schematically shows the configuration of the relief valve 78. The configuration of the relief valve 78 will be described later.

A control unit 100 controls the throttle valve 47 (specifically, the throttle actuator 47a), the relief valve (specifically, the drive source 79a of the drive unit 79), the wastegate valve 54 (specifically, the drive motor 54a), the EGR valve 62, the injector, the spark plug 17, and the phase control mechanism. The control unit 100 is a controller based on a well-known microcomputer, and includes a central processing unit (CPU) for executing a program, a memory configured as, for example, a RAM and a ROM and storing programs and data, and an input/output (I/O) bus through which an electric signal is transferred.

The control unit 100 receives signals from various sensors required to control the engine 1. The various sensors include the first and second pressure sensors 40 and 41. Examples of the various sensors required to control the engine 1 include known sensors, such as an accelerator position sensor for detecting the accelerator position, and an air flow sensor for detecting the flow rate of the intake air sucked into the intake passage 30, in addition to the first and second pressure sensors 40 and 41. Such various sensors are not shown in the drawings. The control unit 100 controls the throttle valve 47, the relief valve 78, the wastegate valve 54, the EGR valve 62, the injector, the spark plug 17, and the phase control mechanism (i.e., controls the engine 1), based on the received signals.

When a pressure difference, which is a value obtained by subtracting the pressure detected by the first pressure sensor 40 (substantially the same value as atmospheric pressure) from the pressure detected by the second pressure sensor 41, is equal to or lower than a predetermined pressure, the control unit 100 fully closes the relief valve 78. The predetermined pressure is slightly greater than a maximum value of the pressure of the intake air supercharged by the compressor 21.

On the other hand, when the pressure difference is greater than the predetermined pressure, the control unit 100 fully opens the relief valve 78. Specifically, when the throttle valve 47 suddenly shifts from an open position to the fully closed position or the position close to the fully closed position, the pressure in the downstream portion 71b and the pressure in the portion of the downstream intake passage 33 between the compressor case 21a and the throttle valve 47 increase, and thus, the pressure difference becomes greater than the predetermined pressure. If the pressure in the downstream portion 71b and the pressure in the portion of the downstream intake passage 33 between the compressor case 21a and the throttle valve 47 excessively increase, the compressor 21 may be broken. Thus, when the pressure difference is greater than the predetermined pressure, the relief valve 78 is fully opened.

The relief valve 78 fully opened as described above allows a portion of the intake air supercharged by the compressor 21 to return to the upstream portion 71a through the air relief passage 72. Then, the returned intake air flows back through the upstream intake passage 32 toward the air inlet 31 (an upstream end of the upstream intake passage 32).

As shown in FIGS. 2 and 3, the upstream portion 71a of the supercharging passage 71 upstream of the compressor 21 and a downstream portion of the upstream intake passage 32 extend linearly in the vehicle width direction. The downstream portion of the upstream intake passage 32 is connected to an upstream portion of the upstream intake passage 32 via a curved portion curved toward the upstream end of the upstream intake passage 32 and the front side of the vehicle. The upstream portion extends from the curved portion toward the front side of the vehicle.

The downstream portion 71b of the supercharging passage 71 downstream of the compressor 21 extends downward from a portion of the supercharging passage 71 where the compressor 21 is disposed, is then curved downward toward the left side of the vehicle (toward the right side of each of FIGS. 2 and 3), and is connected to the downstream intake passage 33 at the outlet 21c of the compressor case 21a. The downstream intake passage 33 extends from the outlet 21c of the compressor case 21a toward the left side of the vehicle through a position below the downstream portion of the upstream intake passage 32, and is then curved toward the downstream end of the downstream intake passage 33 and the front side of the vehicle. Further, the downstream intake passage 33 extends from the curved portion toward the front side of the vehicle through a position below the upstream portion of the upstream intake passage 32, then extends toward the front, lower, and left sides of the vehicle, and is connected to the intercooler 48 disposed near the front end of the vehicle.

A portion of the downstream intake passage 33 (downstream intake pipe 43) downstream of the intercooler 48 extends toward the rear, upper, and left sides of the vehicle, and then extends upward in the vertical direction. The throttle valve 47 is disposed in this upwardly extending portion.

As shown in FIG. 3, the connection passage 77 is connected to an upper portion of the downstream portion 71b. The central axis X2 of the connection passage 77 is parallel to the central axis X1 of the upstream portion 71a, and extends in the vehicle width direction.

As schematically shown in FIG. 4, a valve seat 81 on which a valve body 78a of the relief valve 78 is seated is provided on a wall portion 77a defining the connection passage 77. A valve drive shaft 78b extending in the vehicle width direction is connected to the valve body 78a on the central axis X2 of the connection passage 77. The valve drive shaft 78b is connected to the drive source 79a of the drive unit 79 attached to the drive unit attachment portion 21d through an opening 21e of a wall portion of the compressor case 21a (a wall portion having the drive unit attachment portion 21d). The drive source 79a moving the valve drive shaft 78b in the axial direction of the valve drive shaft 78b (in the vehicle width direction) brings the relief valve 78 into the fully opened position or the fully closed position. In other words, when the valve drive shaft 78b moves toward the left side of the vehicle (right side of FIG. 4), the relief valve 78 is fully opened. When the valve drive shaft 78b moves toward the right side of the vehicle (left side of FIG. 4), the relief valve 78 is fully closed. The opening 21e is closed by a unit case 79b, which will be described later.

Figure 5:
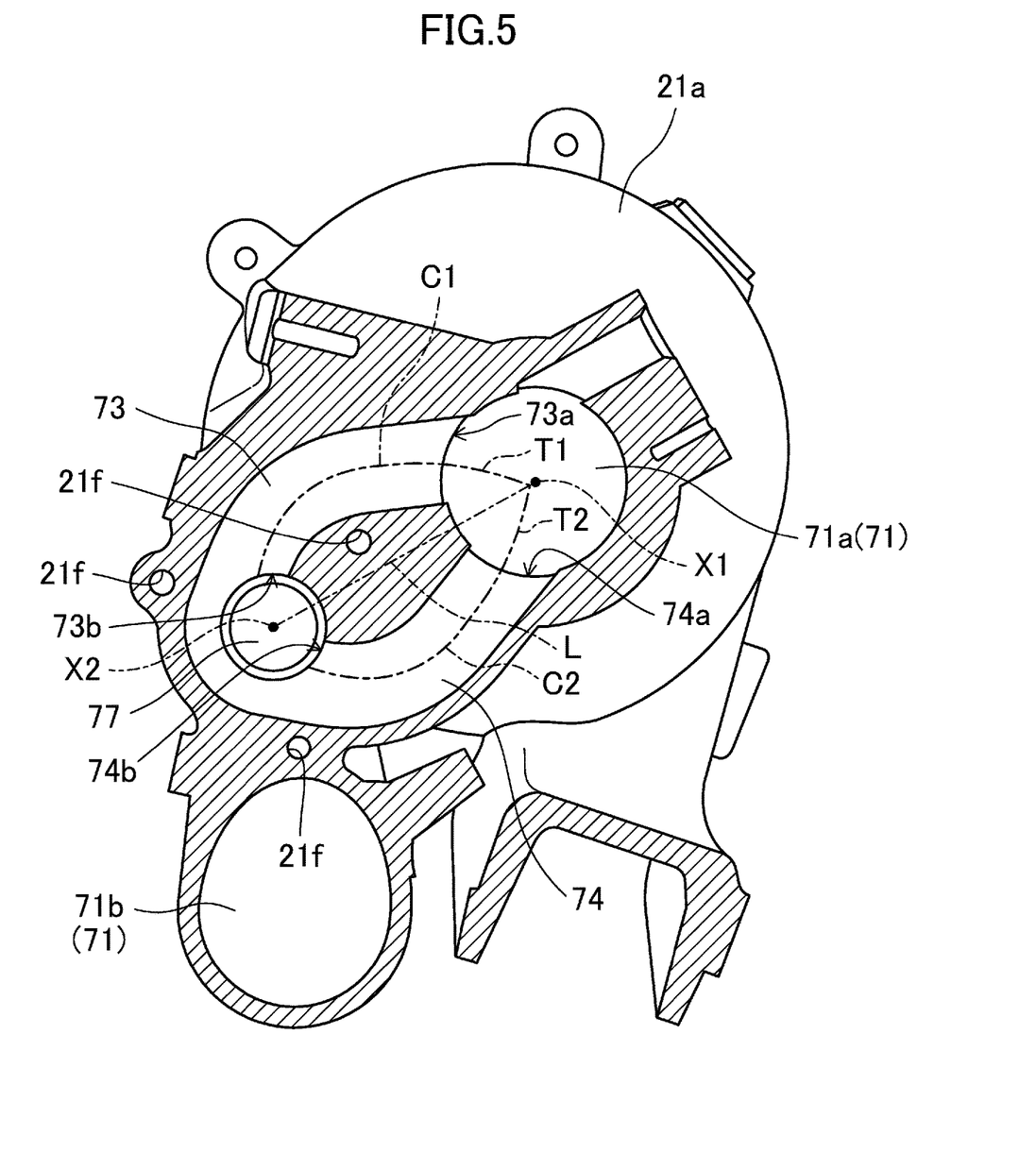
FIG. 5 is a cross-sectional view of an air relief passage (a first passage and a second passage) of the compressor case, taken along the vertical direction.

As shown in FIGS. 3 and 5, the air relief passage 72 has first and second passages 73 and 74 which are formed in a non-linear shape. The first and second passages 73 and 74 are formed in a non-linear shape, particularly when viewed from a direction along the central axis of the upstream portion 71a (which is the vehicle width direction and a direction along the rotation axis of the compressor 21). In this embodiment, the first and second passages 73 and 74 are arranged side by side in the vertical direction, and are curved to protrude away from each other when viewed from the direction along the central axis of the upstream portion 71a (vehicle width direction). In other words, when viewed from the direction along the central axis of the upstream portion 71a, the first passage 73, which is an upper one of these passages, is curved to protrude upward, and the second passage 74, which is a lower one of these passages, is curved to protrude downward.

Further, the first and second passages 73 and 74 respectively have air outflow ports 73a and 74a formed through the inner wall surface of the upstream portion 71a. The first and second passages 73 and 74 further respectively have air inflow ports 73b and 74b formed through the inner wall surface of the connection passage 77.

The air outflow ports 73a and 74a of the first and second passages 73 and 74 are formed through different portions of the inner wall surface of the upstream portion 71a in the circumferential direction of the inner wall surface so as to overlap with each other in the direction along the central axis of the upstream portion 71a. In this embodiment, the air outflow ports 73a and 74a are in the same position in a direction along the central axis of the upstream portion 71a.

FIG. 1 also shows the first and second passages 73 and 74. However, in FIG. 1, for easier understanding, the shapes of the first and second passages 73 and 74 and the positions of the air outflow ports 73a and 74a through the inner wall surface of the upstream portion 71a are not accurate.

Central axis curves C1 and C2 of the first and second passages 73 and 74 are both located on a first plane (the cross section of FIG. 5) perpendicular to the direction along the central axis of the upstream portion 71a. Thus, the air outflow ports 73a and 74a are in the same position in the direction along the central axis of the upstream portion 71a. The first and second passages 73 and 74 are substantially symmetric to each other with respect to a second plane which is set in advance to be perpendicular to the first plane and to include the central axis X1 of the upstream portion 71a. In this embodiment, the second plane is a plane which is perpendicular to the first plane and includes the central axis X1 of the upstream portion 71a and the central axis X2 of the connection passage 77 (indicated by a straight dashed line L passing through the central axis X1 of the upstream portion 71a and the central axis X2 of the connection passage 77 in FIG. 5).

In this embodiment, on the first plane (the cross section of FIG. 5), the first and second passages 73 and 74 are curved so that an extension line T1 extending from the central axis curve C1 of the first passage 73 to border an end of the central axis curve C1 near the air outflow port 73a intersects, in the upstream portion 71a, with an extension line T2 extending from the central axis curve C2 of the second passage 74 to border an end of the center axis curve C2 near the air outflow port 74a.

Figure 6:
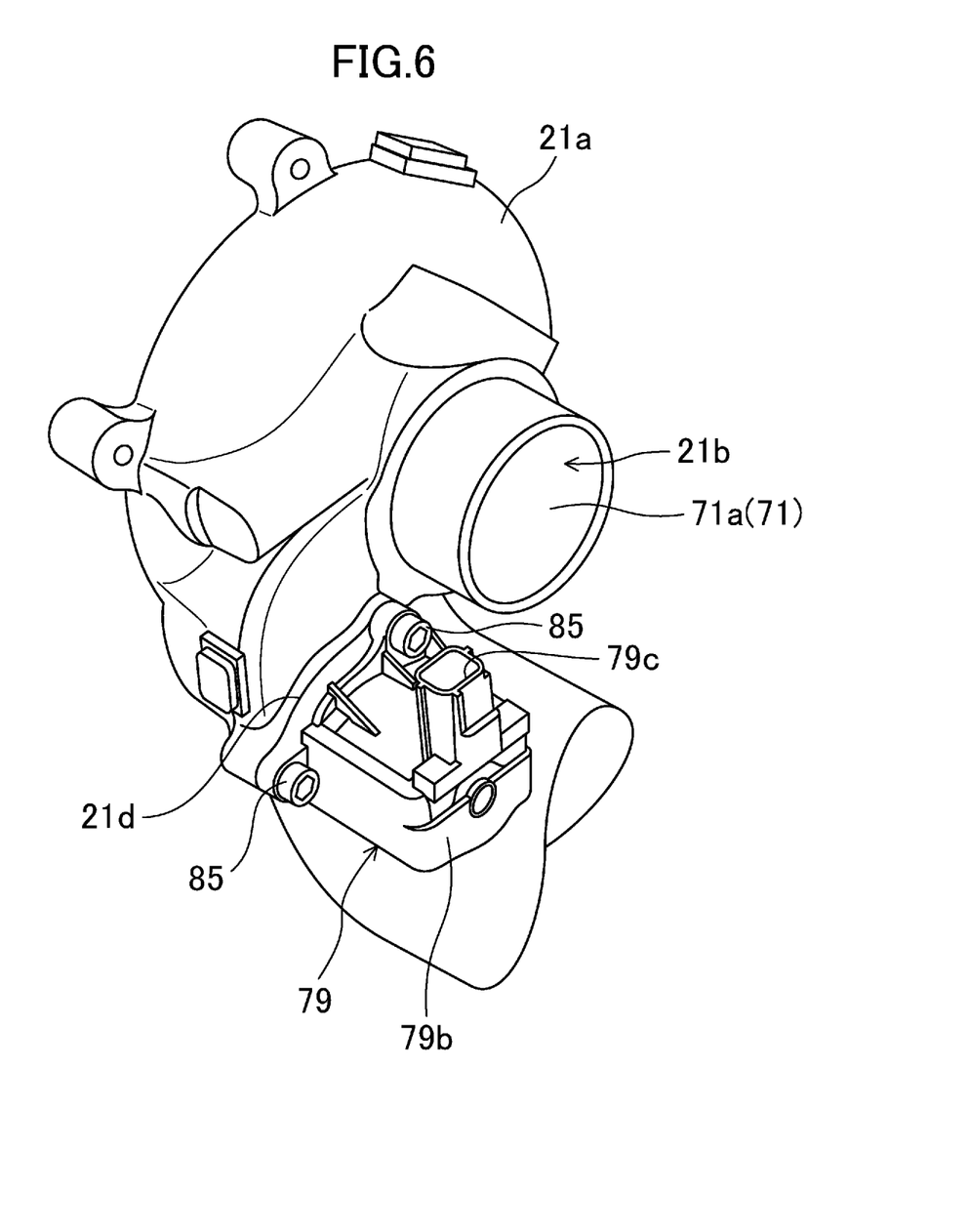
FIG. 6 is a perspective view showing a state in which a drive unit is attached to a drive unit attachment portion of the compressor case.

As shown in FIG. 6, the drive unit 79 includes a unit case 79b (simplified in FIG. 1) that houses the drive source 79a. The unit case 79b is mounted and fixed to the driving unit attachment portion 21d with three bolts 85 serving as fastening members, so that the drive unit 79 is attached to the drive unit attachment portion 21d. Only two of the three bolts 85 are visible in FIG. 6. The drive unit attachment portion 21d is provided at a portion of the surface of the compressor case 21a on the left side of the vehicle relative to the connection passage 77.

As shown in FIGS. 3 and 5, the drive unit attachment portion 21d has three screw holes 21f into which the three bolts 85 are respectively screwed. Only two of the three screw holes 21f are visible in FIG. 3. The three screw holes 21f of the drive unit attachment portion 21d are positioned on or adjacent to a circle centered around the central axis X2 of the connection passage 77, and are uniformly spaced apart in the circumferential direction of the circle. One of the three screw holes 21f and the bolt 85 screwed into the one of the screw holes 21f are positioned at a portion of the drive unit attachment portion 21d between the first and second passages 73 and 74.

An upper surface of the unit case 79b is provided with a connector receiver 79c into which a connector (not shown) provided at a tip end of a wire for supplying a current to the driving source 79a is inserted. An upper side of the connector receiver 79c is open, so that the connector is inserted into the connector receiver 79c from the upper side of the connector receiver 79c. Thus, the connector can be easily inserted into the connector receiver 79c from the upper side of the engine compartment.

Figure 7:
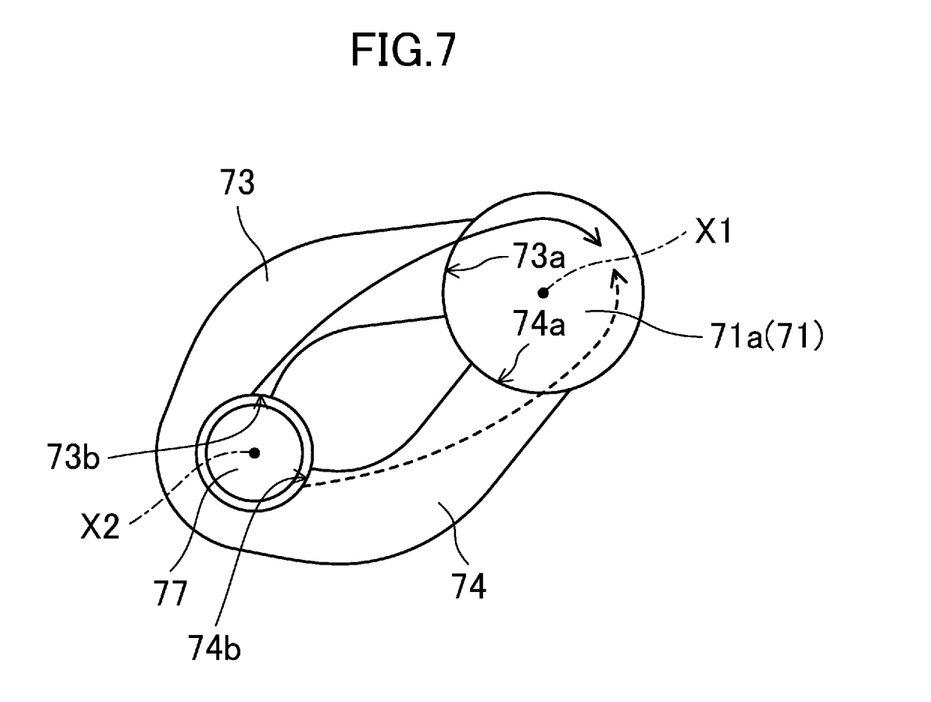
FIG. 7 shows how intake air passing through the first passage and intake air passing through the second passage flow.

Here, suppose the air relief passage 72 is configured as a single passage (only the first passage 73 in this example). In that case, when the relief valve 78 is fully opened, a portion of the intake air supercharged by the compressor 21 is returned to the upstream portion 71a only through the first passage 73. At this time, as indicated by the solid arrow in FIG. 7, the intake air passing through the first passage 73 tends to flow substantially straight without passing along the curved shape of the first passage 73. This causes the intake air to flow through the air outflow port 73a into the upstream portion 71a along the inner wall surface of the upstream portion 71a. Thus, the intake air that has flowed into the upstream portion 71a swirls along the inner wall surface of the upstream portion 71a as it is (i.e., swirls clockwise in FIG. 7). As a result, the intake air that has flowed into the upstream portion 71a flows back toward the air inlet 31 while swirling along the inner wall surface of the upstream portion 71a and the inner wall surface of the upstream intake passage 32. At this time, the upstream intake pipe 36 vibrates due to the swirling flow, thus emitting sound radiation from the surface of the upstream intake pipe 36 (in particular, the downstream portion of the upstream intake passage 36 and the curved portion).

To reduce such sound radiation, not only the first passage 73 but also the second passage 74 is provided. Specifically, the intake air flowing through the air outflow port 73a of the first passage 73 into the upstream portion 71a (see the solid arrow in FIG. 7) and the intake air flowing through the air outflow port 74a of the second passage 74 into the upstream portion 71a (see the broken arrow in FIG. 7) are caused to collide with each other at the upstream portion 71a, thereby reducing the flow velocity of the swirling air that tends to swirl along the inner wall surface of the upstream portion 71a and the inner wall surface of the upstream intake passage 32, or reducing such a swirl flow.

In particular, in this embodiment, on the first plane, the extension line T1 extending from the central axis curve C1 of the first passage 73 to border the end of the central axis curve C1 near the air outflow port 73a intersects, in the upstream portion 71, with the extension line T2 extending from the central axis curve C2 of the second passage 74 to border the end of the central axis curve C2 near the air outflow port 74a. In addition, the first and second passages 73 and 74 are substantially symmetric to each other with respect to the second plane. Thus, the velocity of the intake air flow through the air outflow port 73a of the first passage 73 becomes equal to that of the intake air flow through the air outflow port 74a of the second passage 74, and these intake air flows tend to swirl in the directions opposite to each other (see the solid arrow and the broken arrow in FIG. 7), and collide with each other. This can more effectively reduce the velocity of the swirl flow or reduce the swirl flow.

Further, since the total cross-sectional area of the first and second passages 73 and 74 can be more easily increased than the cross-sectional area of the air relief passage 72 configured as a single passage, the flow velocity of the intake air through the air outflow ports 73a and 74a of the first and second passages 73 and 74 can be reduced. This can also reduce the velocity of the swirl flow or reduce the swirl flow.

Thus, even if a sound insulating material or a damping material is not attached to the surface of the upstream intake pipe 36, sound radiation from the surface of the upstream intake pipe 36 can be reduced.

Figure 8:
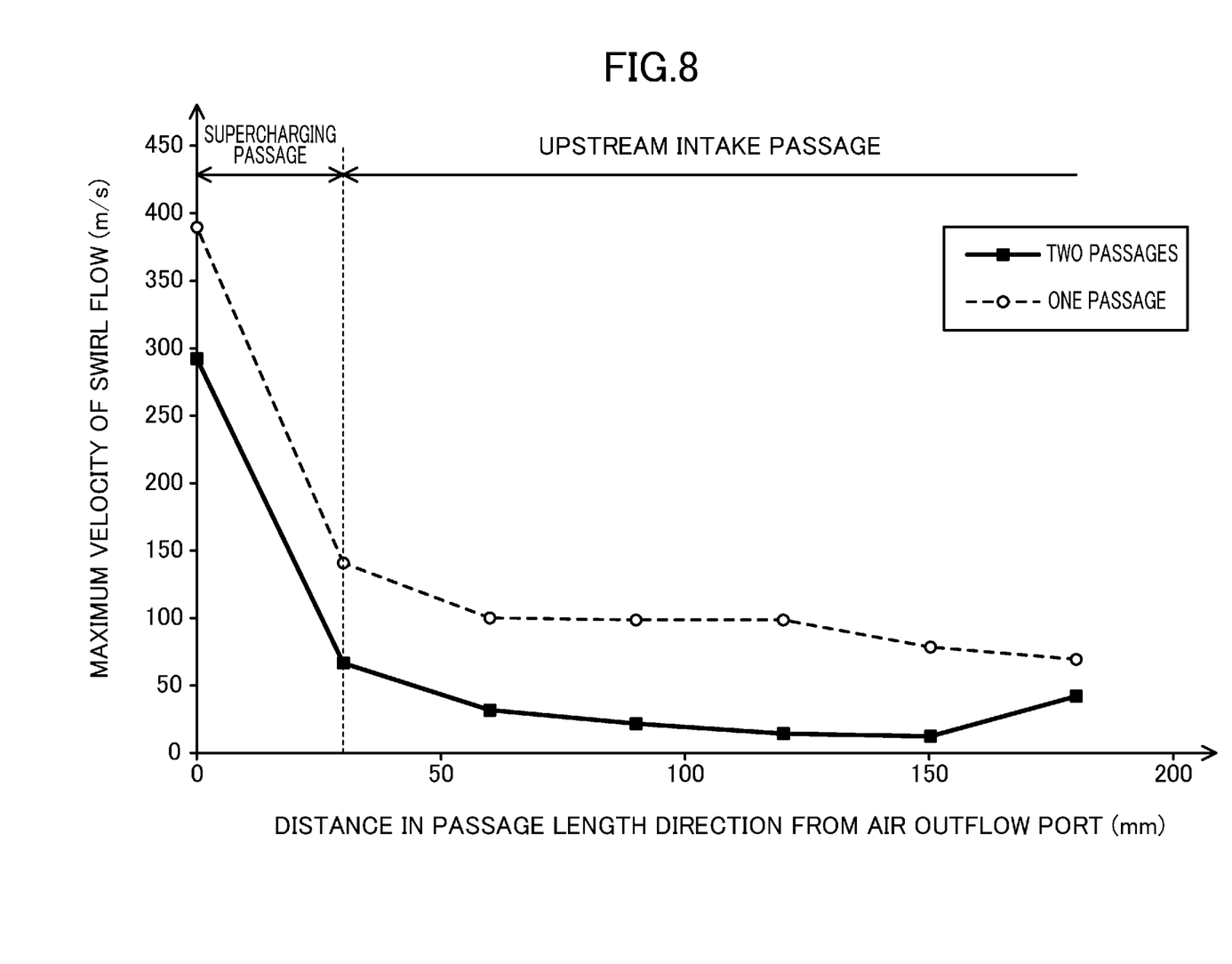
FIG. 8 is a graph showing the relation between a distance from an air outflow port of an air relief passage in a passage length direction and a maximum velocity of a swirl flow in each of a situation where the air relief passage is configured as a single passage and a situation where the air relief passage includes two passages.

FIG. 8 shows the result of examination of the relation between a distance from an air outflow port of the air relief passage 72 in a passage length direction and a maximum velocity of a swirl flow in each of a situation where the air relief passage 72 is configured as a single passage (having substantially the same shape as the first passage 73) and a situation where the air relief passage 72 includes two passages (the first and second passages 73 and 74) as described above. In either of these situations, the pressure in the downstream portion 71b of the supercharging passage 71 downstream of the compressor 21 is set to be 192 kPa.

If the air relief passage 72 includes the two passages, the air outflow ports of the two passages (the air outflow ports 73a and 74a of the first and second passages 73 and 74) are in the same position in the direction along the central axis of the upstream portion 71a of the supercharging passage 71 upstream of the compressor 21, and are about 30 mm away from the inlet 21b of the compressor case 21a in the passage length direction. If the air relief passage 72 is configured as a single passage, the air outflow port of the single passage is also about 30 mm away from the inlet 21b of the compressor case 21a in the passage length direction. In other words, in either of these situations, the inlet 21b of the compressor case 21a is positioned to allow the above-described distance to be about 30 mm. A position at which the above-described distance is shorter than that at the inlet 21b of the compressor case 21a falls within the upstream portion 71a of the supercharging passage 71 upstream of the compressor 21. A position at which the above-described distance is longer than that at the inlet 21b of the compressor case 21a falls within the upstream intake passage 32.

Here, if the air relief passage 72 is configured as a single passage, the cross-sectional area of the single passage is larger than the cross-sectional area of each of two passages forming the air relief passage 72 if the air relief passage 72 includes the two passages. However, the cross-sectional area of the single passage is smaller than the total cross-sectional area of the two passages.

FIG. 8 shows that if the air relief passage 72 includes two passages, the maximum speed of the swirl flow is lower at any position than if the air relief passage 72 is configured as a single passage. In particular, if the condition that the maximum speed of the swirl flow is about 80 m/s or less is satisfied at a distance of 50 to 100 mm from the air outflow port in the upstream intake passage 32, the sound radiation presents no problem even if a sound insulating material or a damping material is not attached to the surface of the upstream intake pipe 36. If the air relief passage 72 is configured as a single passage, such a condition is not satisfied, and the sound radiation presents a problem. On the other hand, it is understood that if the air relief passage 72 includes two passages, such a condition is sufficiently satisfied.

The present invention is not limited to the embodiments described above. Any change can be made within the scope of the claims as appropriate.

The foregoing embodiments are merely preferred examples in nature, and the scope of the present invention should not be interpreted in a limited manner. The scope of the present invention is defined by the appended claims, and all variations and modifications belonging to a range equivalent to the range of the claims are within the scope of the present invention.

INDUSTRIAL APPLICABILITY

The present invention is useful for a turbocharger-equipped engine intake passage structure including an air relief passage provided in an intake passage including a compressor of the turbocharger. The air relief passage is used to return a portion of intake air supercharged by the compressor to a portion of the intake passage upstream of the compressor.

DESCRIPTION OF REFERENCE CHARACTERS

1 Turbocharger-equipped Engine
20 Turbocharger
21 Compressor
21a Compressor Case
21d Drive Unit Attachment Portion
30 Intake Passage
32 Upstream Intake Passage
33 Downstream Intake Passage
47 Throttle Valve
71 Supercharging Passage
71a Upstream Portion of Supercharging Passage Upstream of Compressor
71b Downstream Portion of Supercharging Passage Downstream of Compressor
72 Air Relief Passage
73 First Passage
73a Air Outflow Port of First Passage
74 Second Passage
74a Air Outflow Port of Second Passage
79 Drive Unit
85 Bolt (Fastening Member)

The invention claimed is:

1. An intake passage structure for a turbocharger-equipped engine, the intake passage structure comprising:
a compressor of the turbocharger housed in a compressor case;
an upstream intake passage supplying intake air into the compressor case;
a downstream intake passage supplying the intake air supplied into the compressor case and supercharged by the compressor to an intake port of the engine; and
a throttle valve disposed in the downstream intake passage, wherein
a supercharging passage and an air relief passage are provided in the compressor case, the supercharging passage including the compressor and connecting the upstream intake passage and the downstream intake passage together, the air relief passage connecting an upstream portion of the supercharging passage upstream of the compressor and a downstream portion of the supercharging passage downstream of the compressor together without passing through the compressor, and returning a portion of the intake air supercharged by the compressor to the upstream portion of the supercharging passage upstream of the compressor,
the air relief passage has a first passage and a second passage, each of which is in a non-linear shape,
the first and second passages each have an air outflow port formed through an inner wall surface of the upstream portion of the supercharging passage upstream of the compressor, and
the air outflow port of the first passage and the air outflow port of the second passage are formed through different portions of the inner wall surface in a circumferential direction of the inner wall surface so as to overlap with each other in a direction along a central axis of the upstream portion.

2. The intake passage structure of claim 1, wherein
a central axis curve of the first passage and a central axis curve of the second passage are both located on a first plane perpendicular to the central axis of the upstream portion, and
on the first plane, an extension line extending from the central axis curve of the first passage to border an end of the central axis curve of the first passage near the air outflow port of the first passage intersects, in the upstream portion, with an extension line extending from the central axis curve of the second passage to border an end of the central axis curve of the second passage near the air outflow port of the second passage.

3. The intake passage structure of claim 2, wherein
the first and second passages are substantially symmetric to each other with respect to a second plane that is set in advance to be perpendicular to the first plane and to include the central axis of the upstream portion.

4. The intake passage structure of claim 1, wherein
a relief valve capable of opening and closing the air relief passage is provided at a junction between the supercharging passage and the air relief passage,
a surface of the compressor case has a drive unit attachment portion to which a drive unit driving the relief valve is attached with a plurality of fastening members, and
one of the fastening members is located in a portion of the drive unit attachment portion between the first and second passages.

5. The intake passage structure of claim 1, wherein
the first and second passages are curved to protrude away from each other.

* * * * *